US008952809B2

(12) United States Patent
Kreiner et al.

(10) Patent No.: US 8,952,809 B2
(45) Date of Patent: Feb. 10, 2015

(54) METHODS AND APPARATUS TO PERFORM SELF-PROTECTION PROCEDURES ON ELECTRONIC DEVICES

(71) Applicant: AT&T Intellectual Property I, L.P., Atlanta, GA (US)

(72) Inventors: Barrett M. Kreiner, Woodstock, GA (US); Ryan Schaub, Norcross, GA (US); Randall S. Spell, Douglasville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/736,733

(22) Filed: Jan. 8, 2013

(65) Prior Publication Data
US 2014/0191873 A1 Jul. 10, 2014

(51) Int. Cl.
*G08B 21/00* (2006.01)
*G08B 21/20* (2006.01)

(52) U.S. Cl.
CPC ..................... *G08B 21/20* (2013.01)
USPC ....... 340/539.27; 340/586; 340/604; 702/132

(58) Field of Classification Search
CPC ...... G08B 21/182; G08B 21/20; G08B 23/00; H04M 2250/12
USPC ............................ 340/521, 586, 604; 702/132
See application file for complete search history.

(56) References Cited

U.S. PATENT DOCUMENTS

| | | | | |
|---|---|---|---|---|
| 4,754,618 A | * | 7/1988 | Lejeune | 68/5 C |
| 5,858,537 A | * | 1/1999 | Brown et al. | 428/408 |
| 6,031,455 A | | 2/2000 | Grube et al. | |
| 6,276,155 B2 | * | 8/2001 | Siman-Tov et al. | 62/259.3 |
| 6,450,990 B1 | * | 9/2002 | Walker et al. | 604/113 |
| 6,460,005 B1 | | 10/2002 | Chang | |
| 7,050,837 B2 | * | 5/2006 | Menz et al. | 455/572 |
| 7,764,184 B2 | | 7/2010 | Dobbs et al. | |
| 7,834,754 B2 | | 11/2010 | Kulesz et al. | |
| 7,916,015 B1 | | 3/2011 | Evancich et al. | |

(Continued)

OTHER PUBLICATIONS

Wikipedia "MIL-STD-810" Version dated Dec. 11, 2012 (8 pages).

(Continued)

*Primary Examiner* — Benjamin C Lee
*Assistant Examiner* — Stephen Burgdorf
(74) *Attorney, Agent, or Firm* — Hanley, Flight & Zimmerman, LLC

(57) ABSTRACT

Example methods, apparatus, systems, and computer-readable storage media are provided to monitor a mobile device. An example method includes determining whether environmental condition data collected by a plurality of sensors of a mobile device complies with an environmental condition rule comprising thresholds associated with the environmental condition data. The environmental condition data is representative of external elements detected by the sensors. The example method includes informing a user of the mobile device of an environmental condition associated with the environmental condition data when the environmental condition data does not comply with the environmental condition rule. The example method includes performing a self-protecting procedure via the mobile device. The self-protecting procedure defined in the environmental condition rule is to protect the mobile device from the environmental condition when the environmental condition data does not comply with the environmental condition rule.

15 Claims, 6 Drawing Sheets

(56) References Cited

U.S. PATENT DOCUMENTS

| | | | |
|---|---|---|---|
| 2005/0037730 A1* | 2/2005 | Montague | 455/404.2 |
| 2006/0058069 A1* | 3/2006 | Garcia et al. | 455/567 |
| 2006/0141945 A1* | 6/2006 | Korhonen et al. | 455/90.1 |
| 2007/0284081 A1* | 12/2007 | Lee | 165/80.3 |
| 2011/0105100 A1* | 5/2011 | Tanaka et al. | 455/418 |
| 2011/0135984 A1* | 6/2011 | Ekchian | 429/97 |
| 2013/0182360 A1* | 7/2013 | Stevens et al. | 361/71 |
| 2014/0126137 A1* | 5/2014 | Leonard | 361/679.31 |
| 2014/0167939 A1* | 6/2014 | Mohammed et al. | 340/407.1 |

OTHER PUBLICATIONS

NetBotz, "NetBotz FD100 Fluid Detector" Last modified Nov. 17, 2005 (2 pages).

Becky Ham, "Electrical Engineers Build "No-Waste" Laser" Feb. 9, 2012, (2 pages).

* cited by examiner

METHODS AND APPARATUS TO PERFORM SELF-PROTECTION PROCEDURES ON ELECTRONIC DEVICES

FIELD OF THE DISCLOSURE

The present disclosure relates generally to electronic devices and, more particularly, to systems and methods for monitoring electronic devices.

BACKGROUND

Many mobile devices include a sensor within the housings of the mobile devices to determine when the mobile devices have been exposed to liquids (e.g., to determine when the mobile devices have gotten wet). Such sensors may change colors (e.g., the sensors may change from white to red) when liquids come into contact with the sensors. Such color changes alert service providers when liquids have breached housings of the mobile devices, thus affecting whether device warranties for the mobile devices are still valid.

DETAILED DESCRIPTION

Figure 1:
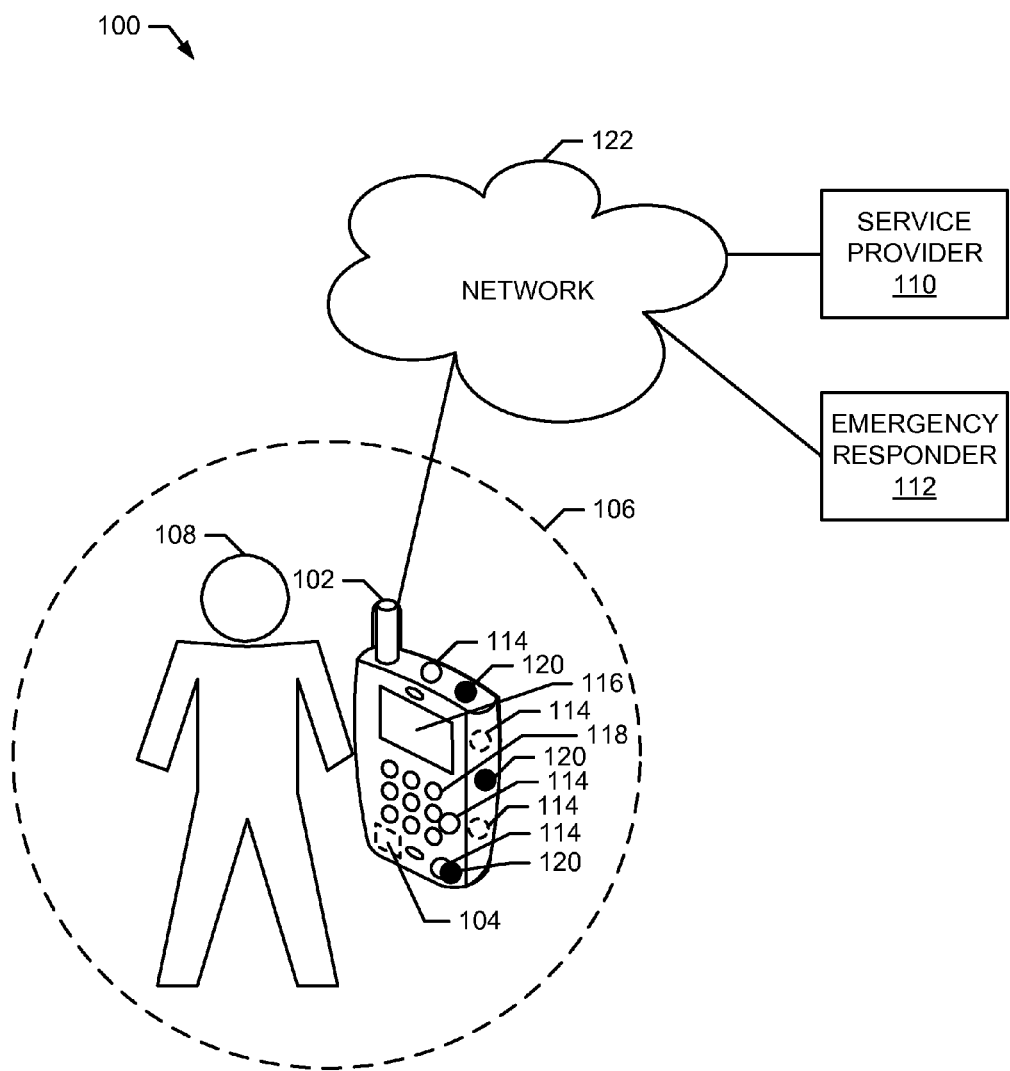
FIG. 1 illustrates an example system implemented in accordance with the teachings of this disclosure to monitor an electronic device.

Many electronic devices such as mobile devices (e.g., mobile phones, tablets, etc.), personal alarm systems, etc. are prone to damage and/or inoperability due to the nature or fragility of various components of the electronic devices. While after-market protective cases may be employed to provide some protection from damage for some electronic devices, such cases are often ineffective to prevent exposure to and/or damage from all environmental conditions that the electronic device could encounter. Exposure to some environmental conditions may damage equipment and/or components, may decrease performance, and/or may cause data loss in the electronic devices.

Mobile devices often include a sensor to determine when the mobile devices have come into contact with liquids (e.g., the sensor changes color when the sensor has gotten wet). However, such sensors alert persons to the existence of liquids at the mobile devices without protecting the mobiles devices from damage.

Example methods, apparatus, systems, and/or computer-readable storage media disclosed herein enable electronic devices to monitor environmental conditions that could affect the electronic devices, and to respond when such environmental conditions impact performance and/or operability of the electronic devices. In the illustrated examples, environmental conditions include external elements such as pressure levels, temperature levels, humidity levels, explosive atmospheres, high acceleration, shock, vibration, light or ultraviolet (UV) exposure, radiation, environmental toxicity levels, electrical potential, foreign substances such as liquids, fungus, salt, sand, dust, etc. In some examples, such external elements may come into contact with a device and/or breach a housing of the device. Examples disclosed herein enable electronic devices to identify negative or adverse environmental conditions, to alert users of the electronic devices of such adverse environmental conditions, to protect the mobile devices (e.g., from damage or decreased performance) from the environmental conditions, and/or to alert other parties (e.g., service carriers) of the presence of such adverse environmental conditions.

In some examples, sensors are located at a plurality of locations on and/or in an electronic device (e.g., a mobile device) to monitor environmental conditions. In some examples, the electronic device includes components to alert a user of the environmental conditions and/or includes dynamically activatable coverings, seals, or protective elements to prevent and/or substantially reduce damage to the mobile device from the environmental conditions.

In some examples, sensors detect liquids (e.g., liquids in contact with the electronic device) outside of an electronic device, at ports of the electronic device, and at electronic components in the electronic device. In this manner, when the different sensors located at different parts of the electronic device detect liquid, the electronic device can provide different levels of alerts to a user of the electronic device via audio messages and/or a display such as "Hey, I'm getting wet," "I'm getting wet inside," "My electronics are now wet, I'm shutting down now," etc. In some examples, the electronic device includes dynamically activatable components and/or seals capable of preventing and/or substantially reducing damage to the electronic device by swelling or moving to close off ports of the electronic device. In some examples, the electronic device notifies a service provider when the electronic device has been exposed to liquids. In some examples, the electronic device shuts down to prevent further damage to the electronic device that could be caused by further exposure to the invading liquid.

In some examples, sensors detect temperatures outside of an electronic device, behind a display of the electronic device, and at electronic components in the electronic device. In some such examples, when temperatures detected at different locations of the electronic device may potentially damage the electronic device (e.g., the temperature is too hot), the electronic device may provide different levels of alerts to a user of the electronic device via audio messages and/or a display such as "It's hot out here, please take me somewhere cool" (e.g., when the temperature outside the electronic device is approaching a maximum external operating temperature), "Approaching thermal limits, slowing down performance" (e.g., when the temperature behind the display is approaching a maximum internal operating temperature), "Above safe thermal limits, I'm shutting down now" (e.g., when internal component temperatures are approaching a maximum component operating temperature), etc. In some examples, the electronic device includes components (e.g., synthetic heat-dissipating hairs or fibers) capable of preventing and/or substantially reducing heat-related damage to the electronic device by dissipating heat away from the mobile device. For example, to begin a cooling process, the heat-dissipating hairs or fibers may be dynamically activated (e.g., raised) during operation of the electronic device when excessive heat is detected outside and/or within the electronic device. In some examples, the electronic device slows down processor speed(s) and/or speed(s) at which tasks/operations are processed to decrease the amount of heat generated by the device and prevent and/or substantially reduce damage to the electronic device. In some examples, the electronic device notifies a service provider when the electronic device has been exposed to unsafe operating temperatures. In some examples, the electronic device shuts down to prevent further damage to the electronic device that could be caused by further exposure to the unsafe operating temperatures while in an operating state.

In some examples, one or more sensors on an electronic device detect radiation and the electronic device provides alerts to a user of the electronic device via audio messages and/or a display such as "Something nearby is generating radiation, please move me away," "Radiation detected, shutting down" etc. In some examples, the electronic device includes components formed of radiation-sensitive materials capable of changing colors to alert the user of the detected radiation. In some examples, the electronic device notifies a service provider when the electronic device has been exposed to radiation. In some examples, the electronic device shuts down to prevent and/or substantially reduce damage to the electronic device that could be caused by further exposure to the radiation while operating.

In some examples, one or more sensors on an electronic device detect extreme acceleration and/or motion. In some examples, the electronic device includes dynamically activatable components and/or coverings capable of swelling to absorb shock from the electronic device impacting a surface at an excessive force.

In some examples, one or more sensors on an electronic device detect sounds such as snoring, glass breaking, etc. In some such examples, when such sounds are detected, the electronic device provides alerts to a user of the electronic device via audio messages and/or a display such as "Wake up, you are snoring," "Wake up, unusual noise detected," etc.

In some examples, one or more sensors on an electronic device detect weather conditions. For example, the electronic device may be provided with a barometric pressure sensor to detect, predict, or forecast rain, storm, or clear conditions. In some such examples, when particular weather conditions are detected, the electronic device provides alerts to a user of the electronic device via audio messages and/or a display such as "It's supposed to rain in an hour," etc.

In some examples, one or more sensors on an electronic device detect a change in ambient air pressure (e.g., possibly indicating a door or window opening). In some such examples, when such a change is detected, the electronic device provides alerts to a user of the electronic device via audio messages and/or a display such as "Wake up, door or window opened," etc. In some examples, the electronic device provides a prompt to the user to notify a service provider, an emergency responder (e.g., police), etc. when the electronic device detects such a change in ambient air pressure. For example, the electronic device may provide an alert to the user such as "Door or window opened, call police?" The user may select to call the police (e.g., if the user suspects that an intrusion in the user's home is in progress) and the electronic device initiates such a call.

In some examples, one or more sensors on an electronic device identify particulates or toxicity levels in an environment surrounding the electronic device. When such particulates of toxicity levels are detected, the electronic device provides alerts to a user of the electronic device via audio messages and/or a display such as "Toxic environment detected," etc. In some examples, the electronic device provides a notification to a service provider of the detected particulates or toxicity levels. In some examples, the electronic device includes dynamically activatable components, seals, and/or coverings capable of swelling or actuating to protect the electronic device from damage that could be caused by further exposure to the detected particulates or toxicity levels. In some examples, the electronic device provides a prompt to the user to notify a service provider, an emergency responder (e.g., an ambulance), etc. when the electronic device detects such particulates or toxicity levels. For example, the electronic device may provide an alert to the user such as "Toxic environment detected, call for help?" The user may select to call for help, and the electronic device initiates such a call.

Disclosed example methods involve determining whether environmental condition data collected by a plurality of sensors of a mobile device complies with an environmental condition rule comprising thresholds associated with the environmental condition data. The environmental condition data is representative of external elements detected by the sensors. The example methods include informing a user of the mobile device of an environmental condition associated with the environmental condition data when the environmental condition data does not comply with the environmental condition rule. The example methods include performing a self-protecting procedure via the mobile device. The self-protecting procedure defined in the environmental condition rule is to protect the mobile device from the environmental condition when the environmental condition data does not comply with the environmental condition rule.

Disclosed example apparatus include a memory storing machine readable instructions and a processor to execute the instructions to determine whether environmental condition data collected by a plurality of sensors of a mobile device complies with an environmental condition rule comprising thresholds associated with the environmental condition data. The environmental condition data is representative of external elements detected by the sensors. The example apparatus is to inform a user of the mobile device of an environmental condition associated with the environmental condition data when the environmental condition data does not comply with the environmental condition rule and perform a self-protecting procedure defined in the environmental condition rule when the environmental condition data does not comply with the environmental condition rule. The self-protecting procedure is to protect the mobile device from the environmental condition.

Disclosed example tangible machine readable media store instructions which, when executed, cause a machine to perform a method that includes determining whether environmental condition data collected by a plurality of sensors of a mobile device complies with an environmental condition rule comprising thresholds associated with the environmental condition data. The environmental condition data is representative of external elements detected by the sensors. The example method includes informing a user of the mobile device of an environmental condition associated with the environmental condition data when the environmental condition data does not comply with the environmental condition rule. The example method includes performing a self-protecting procedure defined in the environmental condition rule when the environmental condition data does not comply with the environmental condition rule. The self-protecting procedure is to protect the mobile device from the environmental condition.

FIG. 1 illustrates an example system 100 including an example mobile device 102 with an example monitoring manager 104 to provide environmental monitoring and alerting. In the example of FIG. 1, the monitoring manager 104 monitors environmental conditions within an environment 106 surrounding the mobile device 102 and a user 108 of the mobile device 102. The monitoring manager 104 of the illustrated example detects negative environmental conditions in the environment 106 and alerts the user 108 of the negative environmental conditions. In some examples, the monitoring manager 104 implements protection processes to protect the mobile device 102 from continued exposure to adverse environmental conditions (e.g., by performing self-protecting procedures) and/or provides alerts to additional parties (e.g., a service provider 110, an emergency responder 112, etc.) of such adverse environmental conditions.

Although the monitoring manager 104 of the illustrated example is implemented within the mobile device 102, the monitoring manager 104 may be incorporated within and/or used in connection with other electronic devices (e.g., personal computers (PCs), speakers, tablets, manufacturing devices, process control devices, etc.). The mobile device 102 of the illustrated example may be a smart phone, a tablet device, a mobile computer, a global position system (GPS) unit, a watch, or any other mobile device. Although examples disclosed herein are described in connection with the mobile device 102, such disclosed examples may be implemented in connection with any other type of electronic device including stationary devices (e.g., stationary computers, servers, automobile computers, etc.).

The mobile device 102 of the illustrated example includes a plurality of sensors 114. The sensors 114 of the illustrated example are located at different locations in and outside of the mobile device 102 to monitor environmental conditions that could adversely affect the operation of the mobile device 102. In the illustrated example, some of the sensors 114 inside the mobile device 102 are located behind a display 116 of the mobile device 102. In the illustrated example, some of the sensors 114 inside the mobile device 102 are located at internal electronics (not shown) of the mobile device 102. For example, some of the sensors 114 could be adhered to one or more integrated circuit components using epoxy, and/or some of the sensors 114 could be integrally formed into one or more of the integrated circuit components. In the illustrated example, some of the sensors 114 outside the mobile device 102 are located at external ports and/or openings (not shown) of the mobile device 102. Such external ports or openings could be, for example, a headphone port, a power port, an accessory port, a microphone opening, a speaker opening, etc. In the illustrated example, some of the sensors 114 outside the mobile device 102 are located at buttons (or keys) 118 of the mobile device 102. Any number and/or locations of sensors 114 may be used to monitor environmental conditions within the environment 106 (e.g., outside and/or in the mobile device 102).

The sensors 114 may monitor different environmental conditions such as a presence of liquids (e.g., water), barometric pressure, weather conditions (e.g., rain, storms, clear conditions, etc.) air pressure, temperature, humidity, explosive atmospheric conditions, acceleration, shock, vibration, light or ultraviolet (UV) light, radiation, toxicity levels, hazardous chemicals, electrical potential, snoring, presence of foreign particulates or abrasives (e.g., salt, sand, dust, fungus), etc. The types, quantity, and/or locations of sensors 114 on the mobile device 102 may be determined based on, for example, types of uses of the mobile device 102. In some examples, the mobile device 102 includes sensors 114 to monitor for barometric pressure, air pressure, temperature, humidity, shock, presence of liquids, and/or snoring when the mobile device 102 is used by a member of the general public for day-to-day communication purposes. The mobile device 102 may further include sensors 114 to monitor explosive atmospheric conditions, acceleration, vibration, light or UV light, radiation, hazardous chemicals, electrical potential, and/or for the presence of foreign particulates or abrasives when the mobile device 102 is used by, for example, a field worker or engineer in a manufacturing environment.

The sensors 114 of the illustrated example collect data related to such environmental conditions for analysis by the monitoring manager 104. To analyze data collected by the sensors 114, the monitoring manager 104 of the illustrated example uses environmental condition rules. Environmental condition rules of the illustrated example specify acceptable thresholds or limits for the different environmental conditions in which the mobile device 102 may operate. For example, the environmental condition rules specify particular thresholds for environmental conditions and how the mobile device 102 is to respond when such thresholds are met or exceeded. The monitoring manager 104 of the illustrated example compares data collected by the sensors 114 to corresponding environmental condition rules to determine whether any of the collected data meets or exceeds thresholds specified in the rules.

In the illustrated example, the environmental condition rules specify how the monitoring manager 104 and/or the mobile device 102 is/are to respond based on different levels of severity of the environmental conditions. In some examples, if the environmental conditions are less severe, the monitoring manager 104 provides a warning to the user 108 of the conditions detected by the sensors 114. The monitoring manager 104 of the illustrated example provides a warning via an audio message and/or a visual message output via the display 116. The warning provided by the monitoring manager 104 may allow the user 108 to take actions to prevent and/or substantially reduce damage to the mobile device 102, for example, by mitigating exposure of the mobile device 102 to the environmental conditions detected by the sensors 114 and by the monitoring manager 104.

In some examples, if the environmental conditions detected by the sensors 114 and by the monitoring manager 104 are more severe, the monitoring manager 104 enables the mobile device 102 to perform self-protecting procedures. In some examples, a self-protecting procedure involves the monitoring manager 104 decreasing processor speeds and/or the speeds at which tasks or operations are processed at the mobile device 102 and/or shutting down the mobile device 102. In some examples, the mobile device 102 includes a plurality of defensive elements 120 to protect self-protecting procedures. The defensive elements 120 of the illustrated example include different dynamically activatable devices, procedures, seals (e.g., physical seals), and/or coverings that the monitoring manager 104 can use to protect the mobile device 102 in response to detecting potentially damaging environmental conditions. In some examples, the defensive elements 120 comprise one or more electronically stimulatable seals and/or coverings at one or more locations (e.g., external ports or openings) of the mobile device 102. In some examples, such electronically stimulatable seals and/or coverings mimic aspects of mammal skin based on biomimicry (e.g., covering may include synthetic sensory receptors, synthetic olfactory receptors, synthetic hair or fibers, etc. and/or facilitate discoloration, swelling, goose bumps, etc.). In some such examples, the defensive elements 120 enable the seals and/or coverings to swell to react to liquids, air pressure, explosive atmosphere, shock, vibration, etc. detected by the sensors 114. In some examples, the seals swell when liquid is detected by the sensors 114 to cover ports of the mobile device 102 through which liquid may enter the mobile device 102. In some examples, the seals are liquid activated in that they swell by absorbing liquid like a sponge. In such examples, in addition to absorbing the liquid, the swelling action causes the seals to seal corresponding ports or openings of the mobile device 102 to prevent any further liquid from entering the mobile device 102. In some examples, the coverings change colors (e.g., show bruises) in response to shock detected by the sensors 114. These color changes may be used to inform users and/or service departments of service carriers where impacts occurred on the mobile device 102. In some examples, the covering changes colors (e.g., shows a tan effect) in response to UV light detected by the sensors 114. These color changes may be used to inform users and/or service departments of service carriers of UV light exposure at the mobile device 102. In some examples, the defensive elements 120 include filaments or fibers (e.g., synthetic hairs) that are dynamically activatable to dissipate heat away from the mobile device 102 when one or more temperatures measured by the sensors 114 exceed(s) one or more threshold(s). Any number and/or type of defensive elements 120 may be incorporated into the mobile device 102. The defensive elements 120 may be incorporated into a single covering or component for the mobile device 102 or may be implemented as multiple separate coverings or components on the mobile device 102. In some examples, the defensive elements 120 are replaceable if damaged by the environmental conditions in the environment 106 (e.g., a seal may be replaced after liquid is detected and the seal swells to absorb the liquid and/or to close off ports of the mobile device 102).

In some examples, if the environmental conditions detected by the monitoring manager 104 are more severe, the monitoring manager 104 notifies a third-party (e.g., the service provider 110, the emergency responder 112, etc.) of the severe environmental conditions. The notification includes information describing the environmental conditions affecting the mobile device 102 and/or information describing actions taken by the mobile device 102 and/or the user 108 in response to the environmental conditions. In some examples, the monitoring manager 104 includes a location of the mobile device 102 with the notification. The monitoring manager 104 may determine the location of the mobile device 102 using any suitable technique (e.g., a global positioning system (GPS)).

In some examples, the service provider 110 provides communication services to the mobile device 102. In some examples, the monitoring manager 104 notifies the service provider 110 of severe environmental conditions, and the service provider 110 stores a log of the notifications. In some examples, the service provider 110 uses the notification information to determine warranty information and/or repair services available for the mobile device 102. In some examples, if the service provider 110 receives a notification that the mobile device 102 is no longer operational due to damage from severe environmental conditions, the service provider 110 may automatically ship a new mobile device (e.g., similar or identical to the mobile device 102) to a shipping address associated with the user 108.

In some examples, the monitoring manager 104 notifies the emergency responder 112 of severe environmental conditions when the severe environmental conditions present a potential health risk to the user 108 of the mobile device 102 (e.g., when an explosive atmosphere or hazardous chemicals are detected by the monitoring manager 104). In some examples, the monitoring manager 104 notifies the emergency responder 112 of severe environmental conditions and the emergency responder 112 dispatches emergency services to the location associated with the mobile device 102 to provide assistance to the user 108.

The mobile device 102 of the illustrated example communicates with the service provider 110 and/or the emergency responder 112 via a network 122. The network 122 may be implemented using any suitable communication interface including, for example, one or more of telephone lines, a cable system, a satellite system, a cellular communication system, alternating current (AC) power lines, the Internet, a radio frequency (RF) transceiver tower, etc. Although the illustrated example includes the service provider 110 and the emergency responder 112, the monitoring manager 104 and/or the mobile device 102 may contact any other person, third-party or service in response to environmental conditions detected by the monitoring manager 104. In some examples, the user 108 may specify an emergency contact (e.g., a family member, a relative, an employer, a medical professional, etc.) that should be notified.

Figure 2:
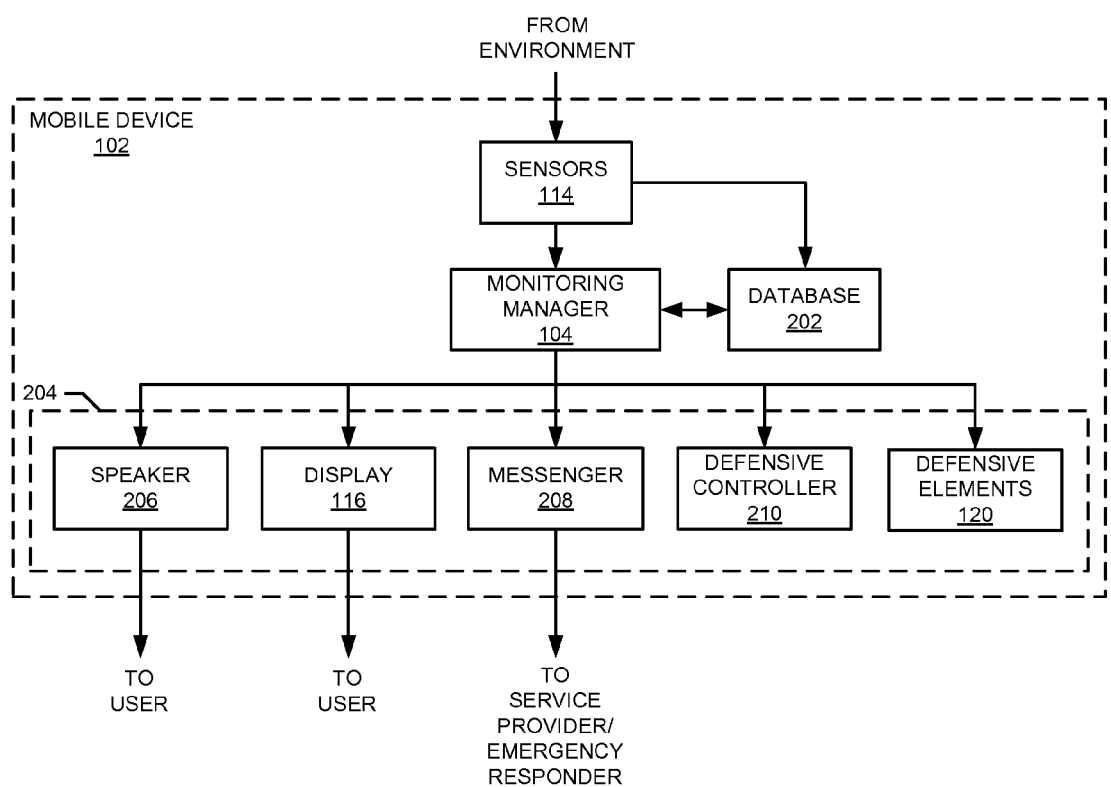
FIG. 2 illustrates an example implementation of an example mobile device of FIG. 1.

FIG. 2 is a block diagram of an example implementation of the mobile device 102 of FIG. 1. As described above, the monitoring manager 104 of the illustrated example monitors environmental conditions of an environment (e.g., the environment 106 of FIG. 1) in which the mobile device 102 and a user (e.g., the user 108 of FIG. 1) of the mobile device 102 are located. When the monitoring manager 104 of the illustrated example detects that environmental conditions may adversely affect (or are adversely affecting) components, performance and/or operation of the mobile device 102, the monitoring manager 104 alerts the user 108 of the environmental conditions, enables the mobile device 102 to perform self-protecting processes to protect itself from the environmental conditions, and/or alerts additional parties (e.g., the service provider 110 of FIG. 1, the emergency responder 112 of FIG. 1, etc.) of the environmental conditions. As shown in FIG. 2, the mobile device 102 includes the sensors 114 and the monitoring manager 104 of FIG. 1, an example database 202, and example outputs 204. As shown in FIG. 2, the outputs 204 include an example speaker 206, an example messenger 208, an example defensive controller 210, and the display 116. In the illustrated example, the outputs 204 also include the defensive elements 120 of FIG. 1.

The sensors 114 of the illustrated example monitor environmental conditions in the environment 106 in which the mobile device 102 and the user 108 are located, and collect data associated with the environmental conditions. The sensors 114 may include any type of sensing device to collect data associated with such environmental conditions. For example, the sensors 114 may include thermal sensors, pressure sensors, inductance sensors, accelerometers, cameras, antennas, microphones, etc. Types of sensors 114 for use in the mobile device 102 may be selected based on use types of the mobile device 102. For example, the mobile device 102 may include more sensors 114 to provide for increased functionality and monitoring capabilities to suit different environments. For example, the mobile device 102 may need different environmental monitoring capabilities if used in an industrial environment than if used in an office environment. Fewer or different sensors 114 may be included in the mobile device 102 to facilitate less extensive monitoring of the environment 106 when, for example, the mobile device 102 is intended for general consumer use rather than use in extreme industrial conditions. In the illustrated example, the database 202 stores environmental condition data collected by the sensors 114 and provides the data to the monitoring manager 104 for analysis.

The monitoring manager 104 of the illustrated example analyzes environmental condition data collected by the sensors 114 to detect if environmental conditions in the environment 106 may adversely affect components, performance, and/or operation of the mobile device 102. To analyze the environmental condition data collected by the sensors 114, the monitoring manager 104 of the illustrated example compares the data to environmental condition rules stored at the database 202.

Environmental condition rules define or describe acceptable thresholds or limits for the environmental conditions in which the mobile device 102 may operate. In examples disclosed herein, an environmental condition is outside or beyond an acceptable threshold when the environmental condition is equal to or greater than (e.g., exceeded) a maximum threshold (e.g., a maximum temperature, a maximum atmospheric pressure, etc.) or when the environmental condition is less than or equal to (e.g., fallen below) a minimum threshold (e.g., a minimum temperature, a minimum atmospheric pressure, etc.). The acceptable thresholds or limits defined in the environmental condition rules may be set automatically (e.g., prior to distribution of the mobile device 102) and/or may be set by a user (e.g., the user 108). In some examples, the acceptable thresholds or limits defined in the environmental condition rules correspond to thresholds or limits set by a standards board or organization (e.g., the thresholds or limits may correspond to operating requirements of consumer-grade products, commercial-grade products, and/or military-grade products). In some examples, there are one or more environmental condition rules for each of the environmental conditions monitored by the sensors 114. For example, if the sensors 114 monitor temperature and for a presence of liquids at the mobile device 102, the database 202 stores one or more environmental condition rules associated with temperature and stores one or more environmental condition rules associated with the presence of liquids. The environmental condition rules specify particular acceptable thresholds for environmental conditions and how the mobile device 102 is to respond when the environmental conditions are outside or beyond the acceptable thresholds.

In the illustrated example, the environmental condition rules specify how the monitoring manager 104 and/or the mobile device 102 is to respond (e.g., using the various outputs 204) based on different levels of severity of the environmental conditions. In some examples, the environmental condition rules define a plurality of thresholds and corresponding actions to be performed or initiated by the monitoring manager 104 when environmental conditions are beyond the respective thresholds. In some examples, the environmental condition rules specify that the monitoring manager 104 is to alert the user 108 via the outputs 204 when one or more of the environmental conditions is/are at or beyond one or more first thresholds. In some examples, the environmental condition rules specify that the monitoring manager 104 is to implement self-protecting procedures to protect the mobile device 102 via the outputs 204 when one or more of the environmental conditions meet(s) or is beyond one or more second thresholds. In some examples, the environmental condition rules specify that the monitoring manager 104 is to notify a third-party (e.g., the service provider 110, the emergency responder 112, etc.) of the environmental conditions via the outputs 204 when one or more of the environmental conditions meet(s) or is beyond one or more third thresholds.

The speaker 206 of the illustrated example is used by the monitoring manager 104 to output an audio warning to inform the user 108 of the environmental conditions detected by the sensors 114 (e.g., if an environmental condition meets or is beyond a first threshold defined in an environmental condition rule). The display 116 of the illustrated example is used by the monitoring manager 104 to output a visual warning to inform the user 108 of the environmental conditions detected by the sensors 114 (e.g., if an environmental condition meets or is beyond a first threshold defined in an environmental condition rule). The warning issued by the monitoring manager 104 via the speaker 206 and/or the display 116 may allow the user 108 to take actions to prevent or substantially reduce damage to the mobile device 102 due to the environmental conditions detected by the monitoring manager 104.

The messenger 208 of the illustrated example is used by the monitoring manager 104 to notify third-parties (e.g., the service provider 110, the emergency responder 112, etc.) of the environmental conditions detected by the monitoring manager 104 (e.g., if one or more environmental conditions meet or are beyond a threshold defined in one or more environmental condition rules). The notification sent to the third parties by the messenger 208 of the illustrated example includes information describing the environmental conditions affecting the mobile device 102 and/or information describing processes or operations performed by the mobile device 102 in response to detecting one or more environmental conditions that meet or are beyond one or more thresholds. In some examples, the messenger 208 includes a geographic location (e.g., latitude and longitude coordinates, a street address, etc.) of the mobile device 102 with the notification. The monitoring manager 104 may determine the location of the mobile device 102 using any suitable method(s) (e.g., a global positioning system (GPS)). In some examples, the monitoring manager 104 notifies the service provider 110 of severe environmental conditions and the service provider 110 uses the notification information to determine warranty information and/or equipment service contracts for the mobile device 102. In some examples, the monitoring manager 104 notifies the emergency responder 112 of severe environmental conditions when the severe environmental conditions present a potential health risk to the user 108 of the mobile device 102 (e.g., when an explosive atmosphere or hazardous chemicals are detected by the monitoring manager 104). In some examples, the monitoring manager 104 provides a prompt to the user 108 via the display 116 to allow the user 108 to select to notify the emergency responder 112 of the severe environmental conditions. In some examples, the emergency responder 112 responds to the severe environmental conditions notification by dispatching emergency services to the location of the mobile device 102 to provide assistance to the user 108.

The defensive controller 210 of the illustrated example is used by the monitoring manager 104 to prevent and/or substantially reduce damage to the mobile device 102 from the environmental conditions detected by the monitoring manager 104 (e.g., if one or more environmental conditions meet or are beyond one or more thresholds defined in one or more environmental condition rules). The defensive controller 210 of the illustrated example allows the mobile device 102 to perform self-protecting procedures to prevent and/or substantially reduce further damage. In some examples, the defensive controller 210 decreases processor speeds at the mobile device 102 and/or shuts down the mobile device 102 in response to environmental conditions that the monitoring manager 104 determines could adversely affect the mobile device 102.

The defensive elements 120 of the illustrated example are used by the monitoring manager 104 to prevent and/or substantially reduce damage to the mobile device 102 due to the environmental conditions detected by the monitoring manager 104 (e.g., if one or more environmental conditions exceed one or more thresholds defined in one or more environmental condition rules). The defensive elements 120 of the illustrated example include different processes, devices, seals, and/or coverings configured to protect the mobile device 102 against damage from environmental conditions that the monitoring manager 104 determines could adversely affect the mobile device 102.

While an example manner of implementing the example mobile device 102 of FIG. 1 is illustrated in FIG. 2, one or more of the elements, processes and/or devices illustrated in FIG. 2 may be combined, divided, re-arranged, omitted, eliminated and/or implemented in any other way. Further, the example sensors 114, the example monitoring manager 104, the example database 202, the example outputs 204, the example speaker 206, the example display 116, the example messenger 208, the example defensive controller 210, the example defensive elements 120, and/or, more generally, the example mobile device 102 of FIG. 2 may be implemented by hardware, software, firmware and/or any combination of hardware, software and/or firmware. Thus, for example, any of the example sensors 114, the example monitoring manager 104, the example database 202, the example outputs 204, the example speaker 206, the example display 116, the example messenger 208, the example defensive controller 210, the example defensive elements 120, and/or, more generally, the example mobile device 102 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the system or apparatus claims of this patent are read to cover a purely software and/or firmware implementation, at least one of the example sensors 114, the example monitoring manager 104, the example database 202, the example outputs 204, the example speaker 206, the example display 116, the example messenger 208, the example defensive controller 210, and/or the example defensive elements 120 are hereby expressly defined to include a tangible computer readable storage device or storage disc such as a memory, DVD, CD, etc. storing the software and/or firmware. Further still, the example mobile device 102 of FIG. 2 may include one or more elements, processes and/or devices in addition to, or instead of, those illustrated in FIG. 2, and/or may include more than one of any or all of the illustrated elements, processes and devices.

Figure 3:
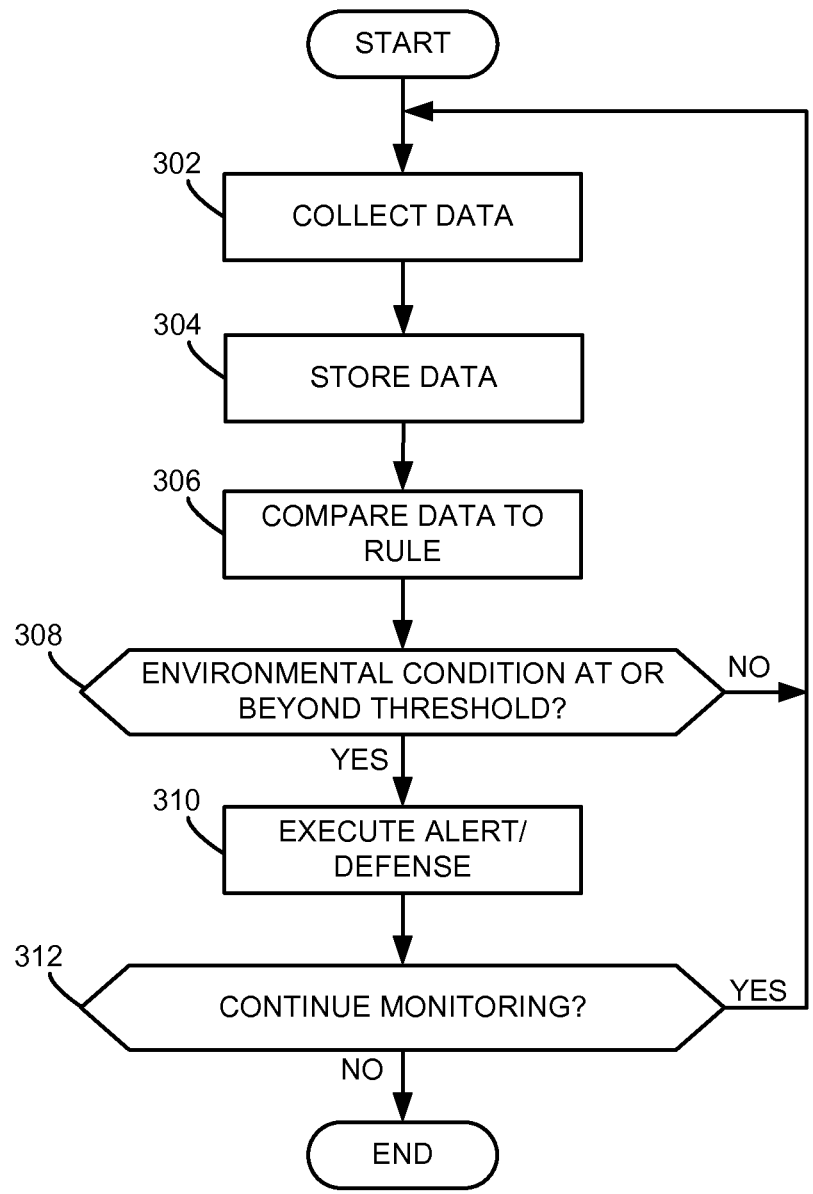
FIG. 3 is a flow diagram representative of example machine readable instructions that may be executed to monitor the example mobile device of FIGS. 1 and 2.
Figure 4:
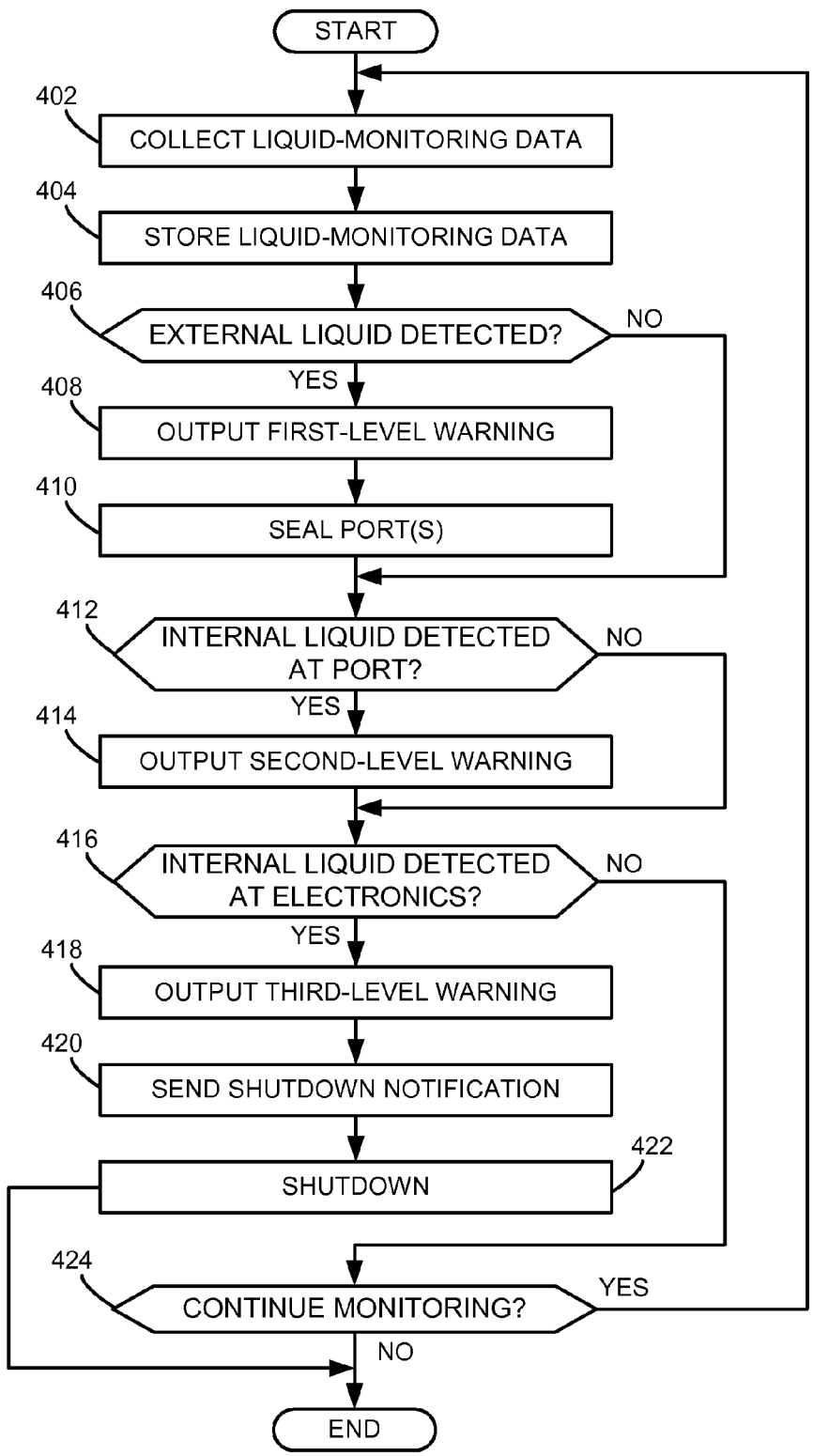
FIG. 4 is another flow diagram representative of example machine readable instructions that may be executed to monitor for liquids that come into contact with the example mobile device of FIGS. 1 and 2.
Figure 5:
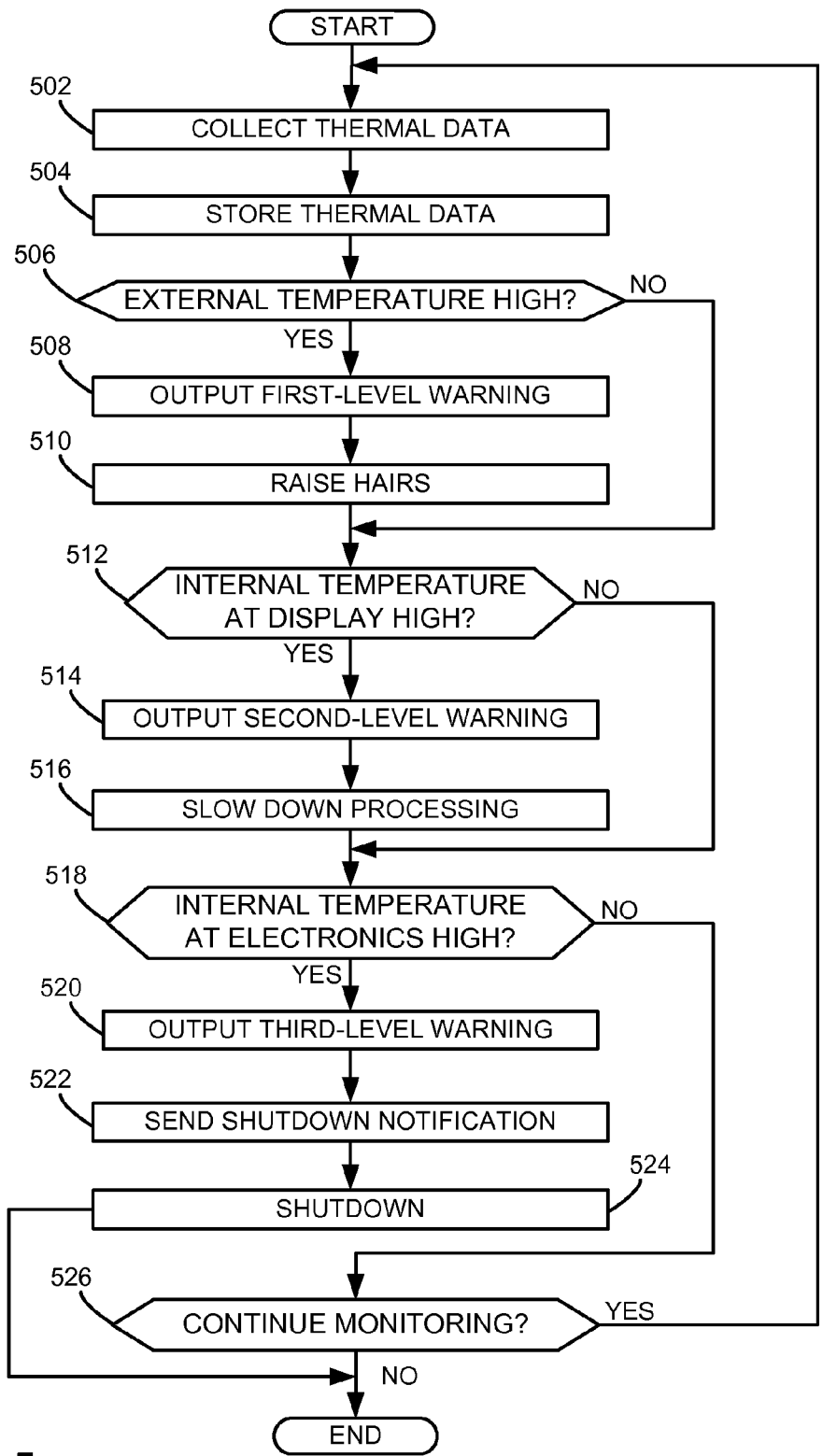
FIG. 5 is another flow diagram representative of example machine readable instructions that may be executed to monitor external and internal temperatures of the example mobile device.

Flowcharts representative of example machine readable instructions for implementing the example mobile device 102 of FIG. 2 are shown in FIGS. 3, 4, and 5. In these examples, the machine readable instructions comprise a program for execution by a processor such as the processor 602 shown in the example computing device 600 discussed below in connection with FIG. 6. The program may be embodied in software stored on a computer readable storage device or storage disc such as a CD-ROM, a floppy disk, a hard drive, a digital versatile disk (DVD), or a memory associated with the processor 602, but the entire program and/or parts thereof could alternatively be executed by a device other than the processor 602 and/or embodied in firmware or dedicated hardware. Further, although the example program is described with reference to the flowcharts illustrated in FIGS. 3, 4, and/or 5, many other methods of implementing the example mobile device 102 may alternatively be used. For example, the order of execution of the blocks may be changed, and/or some of the blocks described may be changed, eliminated, or combined.

As mentioned above, the example processes of FIGS. 3, 4, and/or 5 may be implemented using coded instructions (e.g., computer readable instructions) stored on a tangible computer readable storage device or storage disc such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage device or storage disc is expressly defined to include any type of computer readable storage and to exclude propagating signals. Additionally or alternatively, the example processes of FIGS. 3, 4, and/or 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information).

A flowchart representative of example machine readable instructions for implementing the example mobile device 102 of FIG. 2 is shown in FIG. 3. The mobile device 102 monitors environmental conditions to determine if the environmental conditions could adversely affect performance and/or operation of the mobile device 102, and to provide alerting and/or responses related to the environmental conditions. Initially, the sensors 114 collect data associated with environmental conditions in an environment (e.g., the environment 106 of FIG. 1) in which the mobile device 102 and the user 108 of FIG. 1 are located (block 302). The database 202 stores the environmental condition data (block 304).

The monitoring manager 104 compares the environmental condition data to one or more environmental condition rules (block 306). For example, the monitoring manager 104 analyzes environmental condition data collected by the sensors 114 to determine if environmental conditions in the environment 106 surrounding the mobile device 102 may adversely affect performance and/or operation of the mobile device 102. The monitoring manager 104 determines if the environmental condition data meets or is beyond a threshold defined in a corresponding environmental condition rule (e.g., the monitoring manager 104 determines if the rule has been violated) (block 308). If environmental condition is not at or beyond the threshold defined in a corresponding environmental condition rule (block 308), control returns to block 302, and the sensors 114 continue to collect environmental condition data. If the environmental condition is not at or beyond the threshold defined in a corresponding environmental condition rule (block 308), the monitoring manager 104 executes an alert and/or defense via the outputs 204 (block 310). The alerts and/or defenses are defined in the corresponding environmental condition rule and may differ based on the type and/or severity of the environmental condition. In some examples, the monitoring manager 104 provides an alert by outputting a warning via the speaker 206 and/or the display 116. In some examples, the monitoring manager 104 performs defense procedures (e.g., self-protecting procedures) by slowing down processor speeds or shutting down the mobile device 102 via the defensive controller 210. In some examples, the monitoring manager 104 implements one or more defensive procedures by activating one or more the defensive elements 120. In some examples, the monitoring manager 104 provides one or more alerts by notifying a third party (e.g., the service provider 110 of FIG. 1, the emergency responder 112 of FIG. 1, an emergency contact, etc.) of the environmental conditions via the messenger 208. Once the monitoring manager 104 has executed an alert and/or defense at block 310, the monitoring manager 104 determines whether to continue monitoring the mobile device 102 (block 312). If the monitoring manager 104 determines not to continue monitoring the mobile device 102 (block 312) (e.g., if the mobile device 102 is shut down or is shutting down), the process of FIG. 3 ends. If the monitoring manager 104 determines to continue monitoring the mobile device 102 (block 312), control returns to block 302 and the sensors 114 continue to collect environmental condition data. Otherwise, the example process of FIG. 3 ends.

A flowchart representative of example machine readable instructions for implementing the example mobile device 102 of FIG. 2 to monitor for a presence of liquids is shown in FIG. 4. Initially, the sensors 114 collect data associated with monitoring for the presence of liquids in contact with the mobile device 102 (block 402). For example, liquid-monitoring data may be collected by the sensors 114 located at different locations on the mobile device 102. The database 202 stores the liquid-monitoring data collected by the sensors 114 (block 404) and is passed to the monitoring manager 104 for analysis.

In the illustrated example, one or more environmental condition rules define that any amount of detected liquid is unacceptable (e.g., a threshold value is zero). In the illustrated example, environmental condition rules used by the monitoring manager 104 define that if an external liquid is detected (e.g., if liquid is detected outside of a port of the mobile device 102), the monitoring manager 104 is to provide an alert and/or is to seal the ports of the mobile device using the outputs 204. The environmental condition rules define that if an internal liquid is detected at a port (e.g., if liquid is detected inside of a port of the mobile device 102), the monitoring manager 104 is to provide an alert via the outputs 204. The environmental condition rules define that if an internal liquid is detected at the electronic components of the mobile device 102, the monitoring manager 104 is to provide an alert, is to send a third-party notification, and is to shut down the mobile device 102 using the outputs 204.

The monitoring manager 104 determines whether the liquid-monitoring data collected by the sensors 114 indicates the presence of external liquid (block 406). For example, external liquid is liquid in contact with an external surface of a housing of the mobile device 102. If an external liquid is not detected, control proceeds to block 412. If an external liquid is detected (block 406), the monitoring manager 104 outputs a first-level warning (block 408) via, for example, the speaker 206 and/or the display 116. For example, a first-level warning may involve the monitoring manager 104 providing an alert "I'm getting wet." The monitoring manager 104 seals the one or more ports of the mobile device 102 via the defensive elements 120 (e.g., a seal swells or is otherwise actuated to close the ports) (block 410).

The monitoring manager 104 determines whether the liquid-monitoring data collected by the sensors 114 indicates the presence of internal liquid at the one or more ports of the mobile device 102 (e.g., liquid in contact with one or more ports) (block 412). If an internal liquid at the one or more ports is not detected, control proceeds to block 416. If an internal liquid is detected at the one or more ports of the mobile device 102 (block 412), the monitoring manager 104 outputs a second-level warning (block 414) via, for example, the speaker 206 and/or the display 116. For example, a second-level warning may involve the monitoring manager 104 providing an alert "I'm getting wet inside."

The monitoring manager 104 determines whether the liquid-monitoring data collected by the sensors 114 indicates the presence of internal liquid at internal electronic components of the mobile device 102 (e.g., liquid in contact with internal electronic components) (block 416). If an internal liquid at the internal electronic components is not detected, control proceeds to block 424. If an internal liquid is detected at the electronic components of the mobile device 102 (block 416), the monitoring manager 104 outputs a third-level warning (block 418) via, for example, the speaker 206 and/or the display 116. For example, a third-level warning may involve the monitoring manager 104 providing an alert "My electronics are now wet, I'm shutting down." The monitoring manager 104 sends a shutdown notification to the service provider 110 via the messenger 208 to inform the service provider 110 that the mobile device 102 was exposed to liquids and is shutting down (block 420). The monitoring manager 104 instructs the defensive controller 210 to shut down the mobile device (block 422) and the process of FIG. 4 ends.

The monitoring manager 104 determines whether to continue monitoring (block 424). For example, if a user or service provider has selected an option to not continue monitoring, the monitoring manager 104 determines that it should not continue monitoring. If the monitoring manager 104 determines at block 424 that it should continue monitoring, control returns to block 402. Otherwise, the process of FIG. 4 then ends.

A flowchart representative of example machine readable instructions for implementing the example mobile device 102 of FIG. 2 to monitor temperature is shown in FIG. 5. Initially, the sensors 114 collect data associated with monitoring temperatures of the mobile device 102. For example, temperature data may be collected by the sensors 114 located at different location on the mobile device 102. The database 202 stores the temperature data collected by the sensors 114 (block 504).

In the illustrated example, one or more environmental condition rules define that particular temperatures detected by the sensors 114 are not acceptable (e.g., a threshold value is set to 90° Fahrenheit (F)). In the illustrated example, environmental condition rules used by the monitoring manager 104 define that if an external temperature is too high (e.g., if the temperature detected outside of a port of the mobile device 102 exceeds 90°), the monitoring manager 104 is to provide an alert and/or is to activate heat-dissipating fibers using one or more of the outputs 204. Some example environmental condition rules define that if an internal temperature at the display 116 is too high (e.g., if the temperature detected at the display 116 of the mobile device 102 exceeds 90°), the monitoring manager 104 is to provide an alert via one or more of the outputs 204. Some example environmental condition rules define that if an internal temperature detected at the electronic components of the mobile device 102 is too high (e.g., if the temperature detected at the electronic components of the mobile device 102 exceeds 90°), the monitoring manager 104 is to provide an alert, is to send a third-party notification, and is to shut down the mobile device 102 using one or more of the outputs 204.

The monitoring manager 104 determines whether the temperature data collected by the sensors 114 indicates an external temperature is too high (block 506). If an external temperature is not too high, control proceeds to block 512. If an external temperature is too high (block 506), the monitoring manager 104 outputs a first-level warning (block 508) via, for example the speaker 206 and/or the display 116. For example, a first-level warning may involve the monitoring manager 104 providing an alert "I'm getting hot." The monitoring manager 104 activates heat-dissipating fibers (e.g., raises synthetic heat-dissipating hairs) via the defensive elements 120 to dissipate heat from the mobile device 102 (block 510).

The monitoring manager 104 determines whether the temperature data collected by the sensors 114 indicates an internal temperature at the display 116 that is too high (block 512). If an internal temperature at the display 116 is not too high, control proceeds to block 518. If an internal temperature at the display 116 is too high (block 512), the monitoring manager 104 outputs a second-level warning via the speaker 206 and/or the display 116 (block 514). For example, a second-level warning may involve the monitoring manager 104 providing an alert "Too hot, slowing down." The monitoring manager 104 slows down processing at the mobile device 102 via the defensive controller 210 (block 516).

The monitoring manager 104 determines whether the thermal data collected by the sensors 114 indicates an internal temperature at internal electronic components of the mobile device 102 is too high (block 518). If an internal temperature at internal electronic components of the mobile device 102 is not too high, control proceeds to block 526. If an internal temperature at the electronic components of the mobile device 102 is too high (block 518), the monitoring manager 104 outputs a third-level warning via the speaker 206 and/or the display 116 (block 520). For example, a third-level warning may involve the monitoring manager 104 providing an alert "My electronics are too hot, I'm shutting down." The monitoring manager 104 sends a shutdown notification to the service provider 110 via the messenger 208 to inform the service provider 110 that the mobile device 102 became too hot and is shutting down (block 522). The monitoring manager 104 instructs the defensive controller 210 to shut down the mobile device 102 (block 524) and the process of FIG. 5 ends.

The monitoring manager 104 determines whether to continue monitoring (block 526). For example, if a user or service provider has selected an option to not continue monitoring, the monitoring manager 104 determines that it should not continue monitoring. If the monitoring manager 104 determines at block 526 that it should continue monitoring, control returns to block 502. Otherwise, the process of FIG. 5 then ends.

Figure 6:
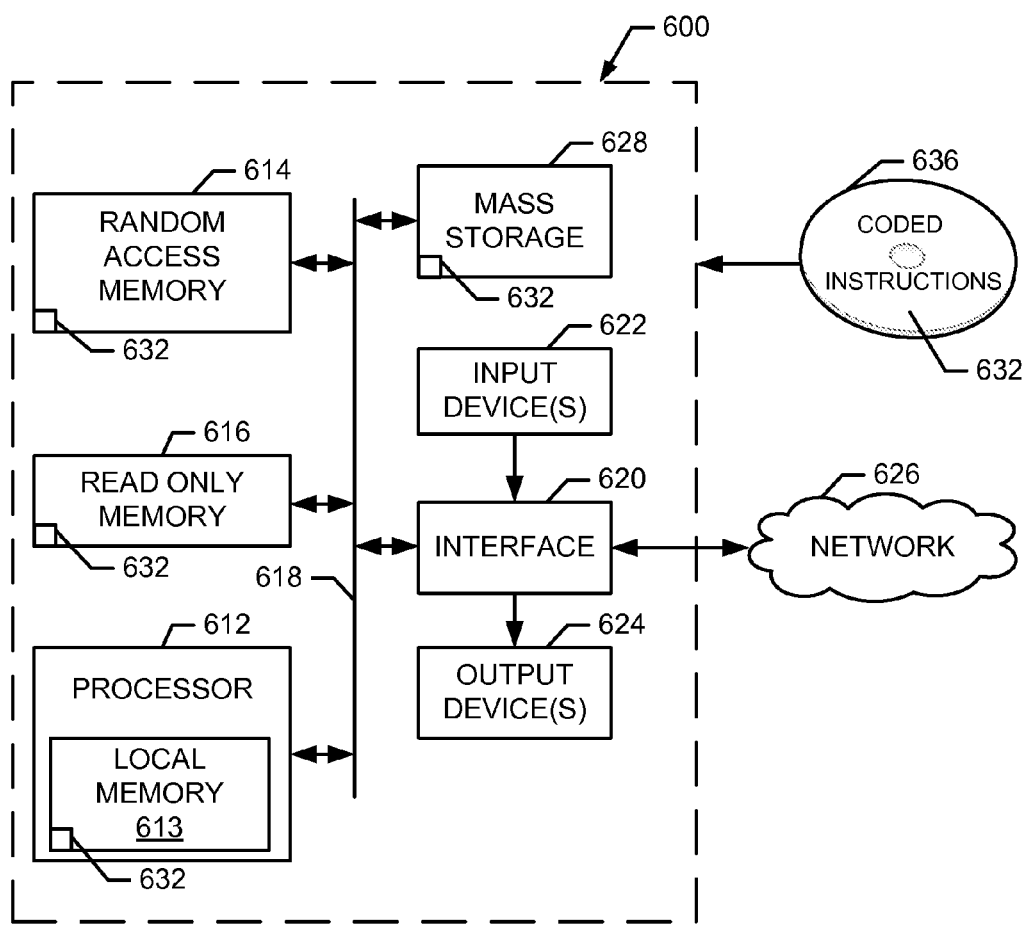
FIG. 6 is a block diagram of an example processor platform that may be used to execute the instructions of FIGS. 3, 4, and/or 5 to implement the example mobile device of FIG. 2.

FIG. 6 is a block diagram of an example processor platform 600 capable of executing the instructions of FIGS. 3, 4, and/or 5 to implement the example mobile device 102 of FIGS. 1 and/or 2, and/or, more generally, the example system 100 of FIG. 1. The processor platform 600 can be, for example, a server, a personal computer, an Internet appliance, a set top box, or any other type of computing device.

The processor platform 600 of the instant example includes a processor 612. For example, the processor 612 can be implemented by one or more microprocessors or controllers from any desired family or manufacturer. The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), etc.). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.).

The processor platform 600 also includes one or more mass storage devices 628 for storing software and data. Examples of such mass storage devices 628 include floppy disk drives, hard drive disks, compact disk drives and digital versatile disk (DVD) drives. The mass storage device 628 may implement a local storage device.

The coded instructions 632 of FIGS. 3, 4, and/or 5 may be stored in the mass storage device 628, in the local memory 613, in the volatile memory 614, in the non-volatile memory 616, and/or on a removable storage medium such as a CD or DVD.

Examples disclosed herein enable electronic devices to monitor environmental conditions affecting the electronic devices and to respond when such environmental conditions impact performance and/or operability of the electronic devices. Examples disclosed herein enable electronic devices to identify negative environmental conditions, to alert users of the electronic devices of such negative environmental conditions, to defend against additional or further negative impact on the mobile devices due to the environmental conditions, and/or to alert other parties of such negative environmental conditions.

Although certain example methods, systems, apparatus, and articles of manufacture have been described herein, the scope of coverage of this patent is not limited thereto. On the contrary, this patent covers all methods, systems and articles of manufacture fairly falling within the scope of the claims of this patent.

What is claimed is:
1. A method comprising:
 determining whether temperature data collected by a temperature sensor of a mobile electronic device complies with a temperature threshold associated with the temperature data; and
 when the temperature data does not comply with the temperature threshold:
  informing a user of the mobile electronic device of an elevated device temperature and
  at least one of automatically raising and automatically moving heat-dissipating hairs of the mobile electronic device to dissipate heat away from the mobile electronic device.

2. The method of claim 1, wherein determining whether the temperature data complies with the temperature threshold comprises comparing the temperature data to the temperature threshold.

3. The method of claim 1, wherein informing the user of the mobile electronic device of the elevated device temperature comprises outputting a warning associated with the elevated device temperature via at least one of an audio message and a display.

4. The method of claim 1, wherein informing the user of the mobile electronic device of the elevated device temperature comprises sending a notification associated with the elevated device temperature to a service provider.

5. The method of claim 1, further comprising, when the temperature data does not comply with the temperature threshold, at least one of reducing a processing speed of the mobile electronic device and shutting down the mobile electronic device.

6. A mobile electronic device, comprising:
   a temperature sensor;
   heat-dissipating hairs to increase a rate of heat dissipation away from the mobile electronic device when the heat-dissipating hairs are at least one of raised and moved;
   a processor; and
   a memory comprising machine readable instructions that, when executed by the processor, cause the processor to perform operations comprising:
      determining whether temperature data collected by the temperature sensor of the mobile electronic device complies with a temperature threshold; and
      when the temperature data does not comply with the temperature threshold, informing a user of the mobile electronic device of an elevated device temperature, and
      at least one of automatically raising and automatically moving the heat-dissipating hairs to increase heat dissipation away from the mobile electronic device.

7. The mobile electronic device of claim 6, wherein the machine readable instructions are to cause the processor to determine whether the temperature data complies with the temperature threshold by comparing the temperature data to the temperature threshold.

8. The mobile electronic device of claim 6, wherein the machine readable instructions are to cause the processor to inform the user of the mobile electronic device of the elevated device temperature by outputting a warning associated with the elevated device temperature via at least one of an audio message and a display.

9. The mobile electronic device of claim 6, wherein the machine readable instructions are to cause the processor to inform the user of the mobile electronic device of the elevated device temperature by sending a notification associated with the elevated device temperature to a service provider.

10. The mobile electronic device of claim 6, wherein the machine readable instructions are to cause the processor to, when the temperature data does not comply with the temperature threshold, at least one of reduce a processing speed of the processor and shut down the mobile electronic device.

11. A tangible machine readable medium comprising instructions which, when executed, cause a mobile electronic device to perform operations comprising:
    determining whether temperature data collected by a temperature sensor of the mobile electronic device complies with a temperature threshold; and
    when the temperature data does not comply with the temperature threshold:
       informing a user of the mobile electronic device of an elevated device temperature; and
       at least one of automatically raising and automatically moving heat-dissipating hairs of the mobile device to dissipate heat away from the mobile electronic device.

12. The tangible machine readable medium of claim 11, wherein determining whether the temperature data complies with the temperature threshold comprises comparing the temperature data to the temperature threshold.

13. The tangible machine readable medium of claim 11, wherein informing the user of the mobile electronic device of the elevated device temperature comprises outputting a warning associated with the elevated device temperature via at least one of an audio message and a display.

14. The tangible machine readable medium of claim 11, wherein informing the user of the mobile electronic device of the elevated device temperature comprises sending a notification associated with the elevated device temperature to a service provider.

15. The tangible machine readable medium of claim 11, wherein the operations further comprise, when the temperature data does not comply with the temperature threshold, at least one of reducing a processing speed of the mobile electronic device and shutting down the mobile electronic device.

\* \* \* \* \*